(12) United States Patent
Chandrasekaran

(10) Patent No.: US 11,513,885 B2
(45) Date of Patent: Nov. 29, 2022

(54) AUTONOMOUS ERROR CORRECTION IN A MULTI-APPLICATION PLATFORM

(71) Applicant: ServiceNow, Inc., Santa Clara, CA (US)

(72) Inventor: Yuvaraj Chandrasekaran, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 82 days.

(21) Appl. No.: 17/176,823

(22) Filed: Feb. 16, 2021

(65) Prior Publication Data
US 2022/0261306 A1  Aug. 18, 2022

(51) Int. Cl.
*G06F 11/07* (2006.01)
*G06F 16/23* (2019.01)
(Continued)

(52) U.S. Cl.
CPC ...... *G06F 11/0793* (2013.01); *G06F 11/0709* (2013.01); *G06F 11/079* (2013.01); *G06F 11/0748* (2013.01); *G06F 11/0757* (2013.01); *G06F 11/1438* (2013.01); *G06F 11/3072* (2013.01); *G06F 16/2365* (2019.01)

(58) Field of Classification Search
CPC ............ G06F 11/0793; G06F 11/0748; G06F 11/079; G06F 11/3072; H04L 41/0631; H04L 41/0636; H04L 41/064; H04L 41/0645; H04L 41/065
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 2/2006 |

(Continued)

OTHER PUBLICATIONS

U.S. Appl. No. 16/855,744, filed Apr. 22, 2020.

*Primary Examiner* — Gabriel Chu
(74) *Attorney, Agent, or Firm* — McDonnell Boehnen Hulbert & Berghoff LLP

(57) ABSTRACT

An embodiment may involve, based on a pre-defined trigger associated with a particular application, reading error data from a resource that is used by the particular application, wherein persistent storage contains definitions of a plurality of error scenarios, a plurality of fix scripts, and associations between each of the plurality of error scenarios and one or more of the plurality of fix scripts; applying one or more rules to the error data, wherein the rules involve pattern matching or parsing; based on applying the one or more rules, determining a particular error scenario represented in the error data, wherein the particular error scenario is one of the plurality of error scenarios; determining, based on the associations, a particular fix script associated with the particular error scenario, wherein the particular fix script is one of the plurality of fix scripts; and causing execution of the particular fix script.

20 Claims, 9 Drawing Sheets

(51) Int. Cl.
*G06F 11/14* (2006.01)
*G06F 11/30* (2006.01)

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,351,247 A * | 9/1994 | Dow | G06F 11/2257 706/14 |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,463,768 A * | 10/1995 | Cuddihy | G06F 11/079 714/37 |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,377,959 B1 | 4/2002 | Carlson | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 9,098,555 B2 | 8/2015 | Bjork et al. | |
| 9,542,259 B1 * | 1/2017 | McEwen | G06F 11/2257 |
| 10,079,730 B2 | 9/2018 | Subramanian et al. | |
| 10,621,077 B2 | 4/2020 | Wiener et al. | |
| 11,397,629 B1 * | 7/2022 | Koneru | G06F 11/3476 |
| 2002/0053044 A1 * | 5/2002 | Gold | G06F 11/1417 714/6.24 |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2004/0002371 A1 * | 1/2004 | Paquin | G07F 7/02 463/17 |
| 2005/0015217 A1 | 1/2005 | Weidl et al. | |
| 2005/0091356 A1 | 4/2005 | Izzo | |
| 2006/0026453 A1 | 2/2006 | Frost et al. | |
| 2006/0095461 A1 | 5/2006 | Raymond | |
| 2006/0149707 A1 | 7/2006 | Mitchell et al. | |
| 2006/0179058 A1 | 8/2006 | Bram et al. | |
| 2006/0293942 A1 | 12/2006 | Chaddha et al. | |
| 2007/0033279 A1 | 2/2007 | Battat et al. | |
| 2007/0043975 A1 * | 2/2007 | Varadarajan | G06F 11/1438 714/25 |
| 2007/0150690 A1 * | 6/2007 | Chen | G06F 3/0644 711/170 |
| 2007/0188494 A1 | 8/2007 | Agutter et al. | |
| 2007/0288389 A1 | 12/2007 | Vaughan et al. | |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0228984 A1 | 9/2009 | Sterin | |
| 2010/0110932 A1 | 5/2010 | Doran et al. | |
| 2010/0312861 A1 * | 12/2010 | Kolhi | H04L 67/56 709/219 |
| 2012/0016706 A1 | 1/2012 | Pargaonkar et al. | |
| 2014/0310222 A1 * | 10/2014 | Davlos | G06F 11/2294 706/46 |
| 2014/0365828 A1 * | 12/2014 | Jiang | G06F 11/0709 714/37 |
| 2015/0089309 A1 * | 3/2015 | Fu | G06F 11/0724 714/57 |
| 2016/0210033 A1 * | 7/2016 | Gagneraud | G06F 11/2294 |
| 2016/0224401 A1 * | 8/2016 | Adinarayan | G06F 11/0766 |
| 2017/0083912 A1 | 3/2017 | Hammad et al. | |
| 2018/0150348 A1 * | 5/2018 | Hecox | G06F 11/0793 |
| 2019/0163594 A1 * | 5/2019 | Hayden | G06F 11/079 |
| 2019/0179691 A1 * | 6/2019 | Xu | G06F 11/0778 |
| 2020/0174870 A1 * | 6/2020 | Xu | G06F 11/0784 |
| 2020/0183805 A1 * | 6/2020 | Togawa | G06F 11/3476 |

(56) References Cited

U.S. PATENT DOCUMENTS

| | | | |
|---|---|---|---|
| 2020/0241953 A1* | 7/2020 | Ali | G06F 11/0787 |
| 2021/0034454 A1* | 2/2021 | Spiro | G06F 11/0793 |
| 2021/0157665 A1* | 5/2021 | Rallapalli | G06F 11/302 |
| 2022/0083883 A1 | 3/2022 | Devanathan et al. | |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

AUTONOMOUS ERROR CORRECTION IN A MULTI-APPLICATION PLATFORM

BACKGROUND

Multi-application platforms, such as remote network management platforms, consist of numerous software applications, programs, modules, and scripts. It is inevitable that at least some of these will experience errors (e.g., instability, incorrect operation, and/or undesirable behavior) from time to time. It can be challenging to identify when such behavior occurs, much less determine how to rectify the situation. This leads to long detection and resolution cycles, perhaps stretching out over hours or days, thus having a deleterious impact on user experience.

SUMMARY

The embodiments herein address these and potentially other problems by providing techniques for automated error detection and correction in multi-application platforms. In particular, an error scenario mapper is configured to receive and/or read input information that was produced by or related to the execution of various applications. Error scenarios are defined as sets of one or more events, patterns, output values, behaviors, and so on relating to one or more of these applications. Each error scenario is associated with one or more "fix scripts", which are programs that attempt to rectify the associated error. When the error scenario mapper matches the input information to a predefined error scenario, it triggers execution of the associated fix scripts. As a result, errors can be addressed and possibly resolved in a matter of seconds or minutes without human intervention. In many cases, errors can be resolved so quickly that users are not even aware of their occurrence.

Accordingly, a first example embodiment may involve persistent storage containing an error identifier application, an error scenario mapping application, definitions of a plurality of error scenarios, a plurality of fix scripts, and associations between each of the plurality of error scenarios and one or more of the plurality of fix scripts. One or more processors may be configured to: (i) possibly based on a pre-defined trigger associated with a particular application configured to execute on the system, read, by the error identifier application, error data from a resource that is stored on the system that is used by the particular application; (ii) apply, by the error scenario mapping application, one or more rules to the error data, wherein the rules involve pattern matching or parsing; (iii) possibly based on applying the one or more rules, determine, by the error scenario mapping application, a particular error scenario represented in the error data, wherein the particular error scenario is one of the plurality of error scenarios; (iv) determine, by the error scenario mapping application and based on the associations, a particular fix script associated with the particular error scenario, wherein the particular fix script is one of the plurality of fix scripts; and (v) cause execution of the particular fix script.

A second example embodiment may involve, possibly based on a pre-defined trigger associated with a particular application, reading, by an error identifier application, error data from a resource that is used by the particular application, wherein persistent storage contains definitions of a plurality of error scenarios, a plurality of fix scripts, and associations between each of the plurality of error scenarios and one or more of the plurality of fix scripts. The second example embodiment may also involve applying, by an error scenario mapping application, one or more rules to the error data, wherein the rules involve pattern matching or parsing. The second example embodiment may also involve, possibly based on applying the one or more rules, determining, by the error scenario mapping application, a particular error scenario represented in the error data, wherein the particular error scenario is one of the plurality of error scenarios. The second example embodiment may also involve determining, by the error scenario mapping application and based on the associations, a particular fix script associated with the particular error scenario, wherein the particular fix script is one of the plurality of fix scripts. The second example embodiment may also involve causing execution of the particular fix script.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
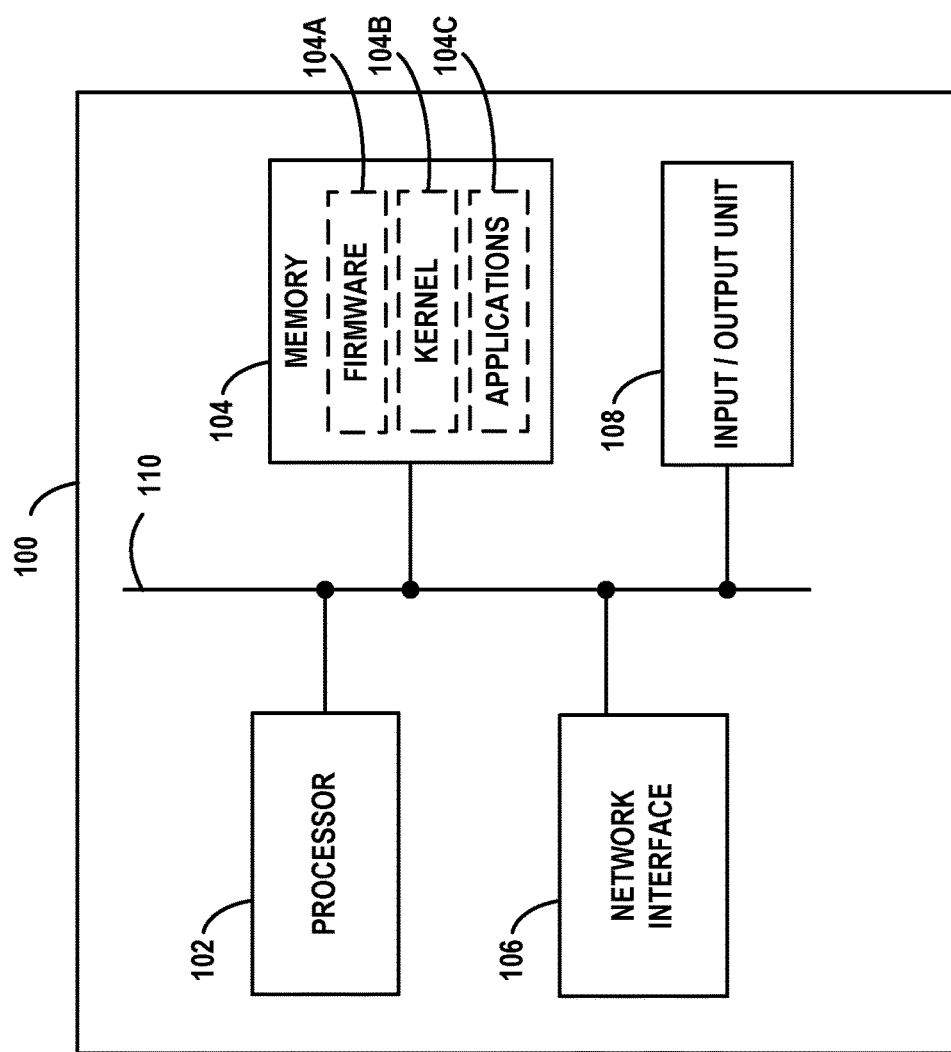
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
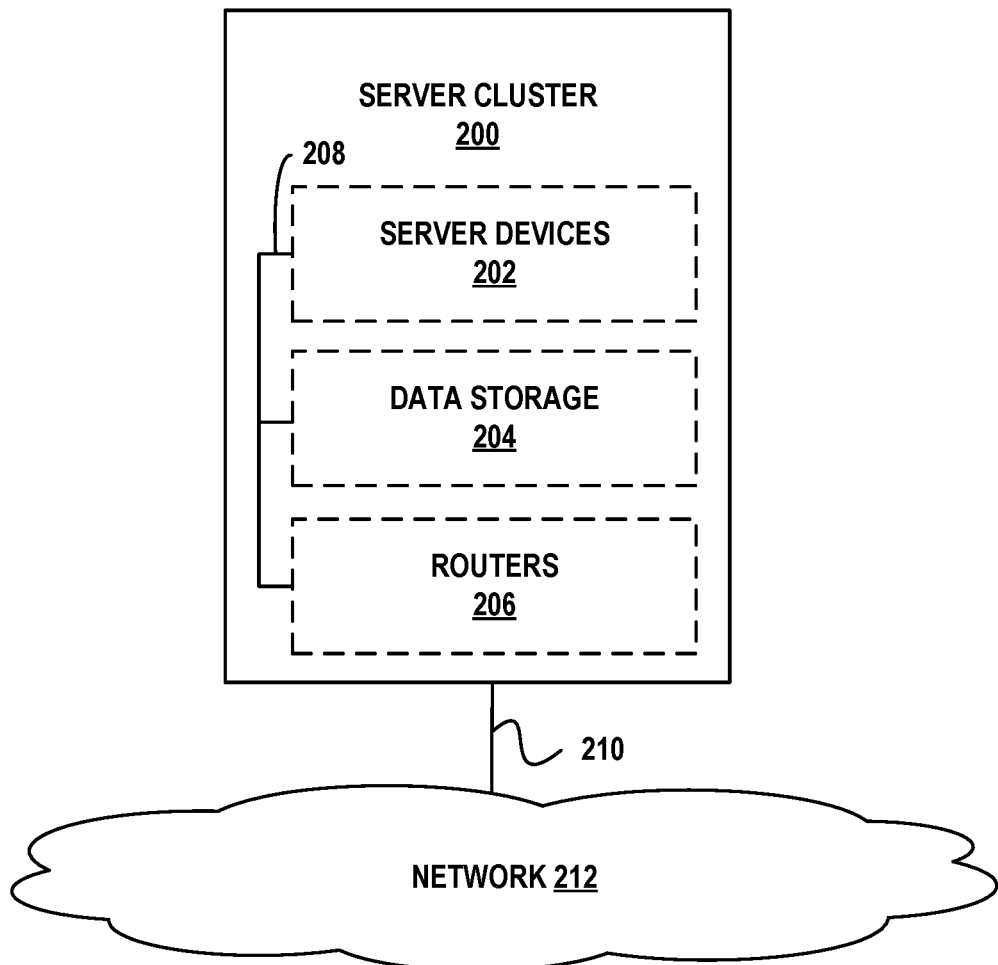
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
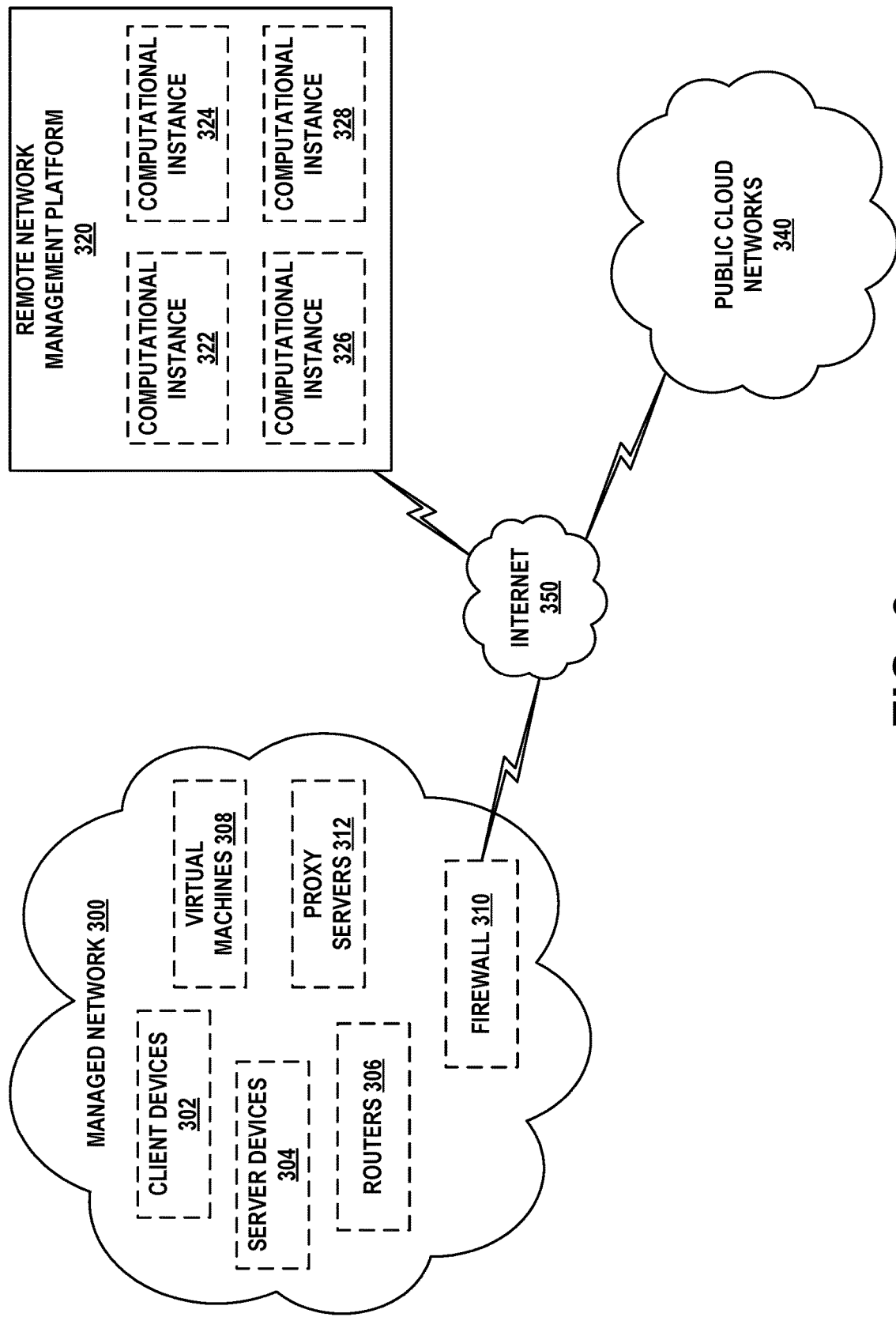
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
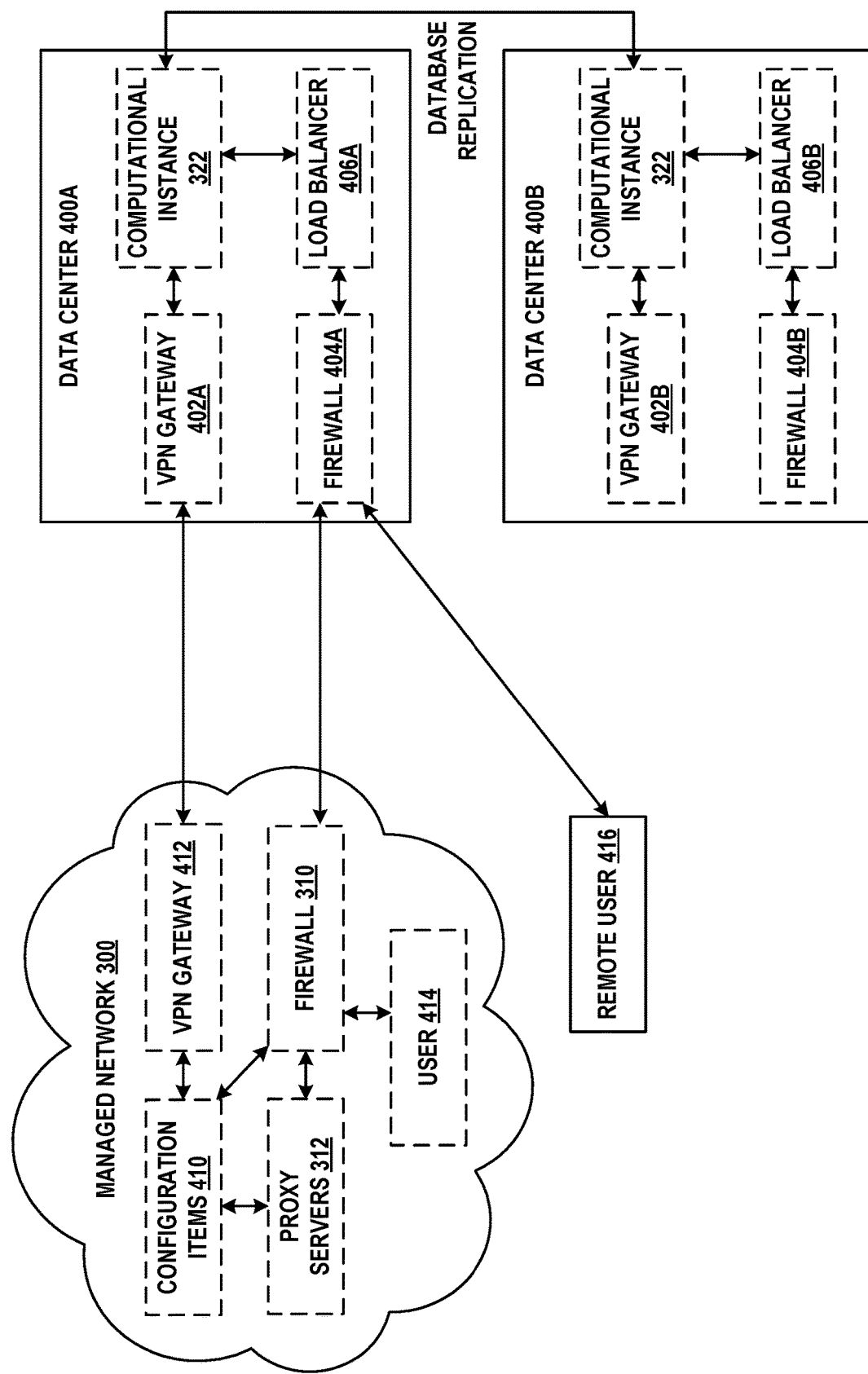
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
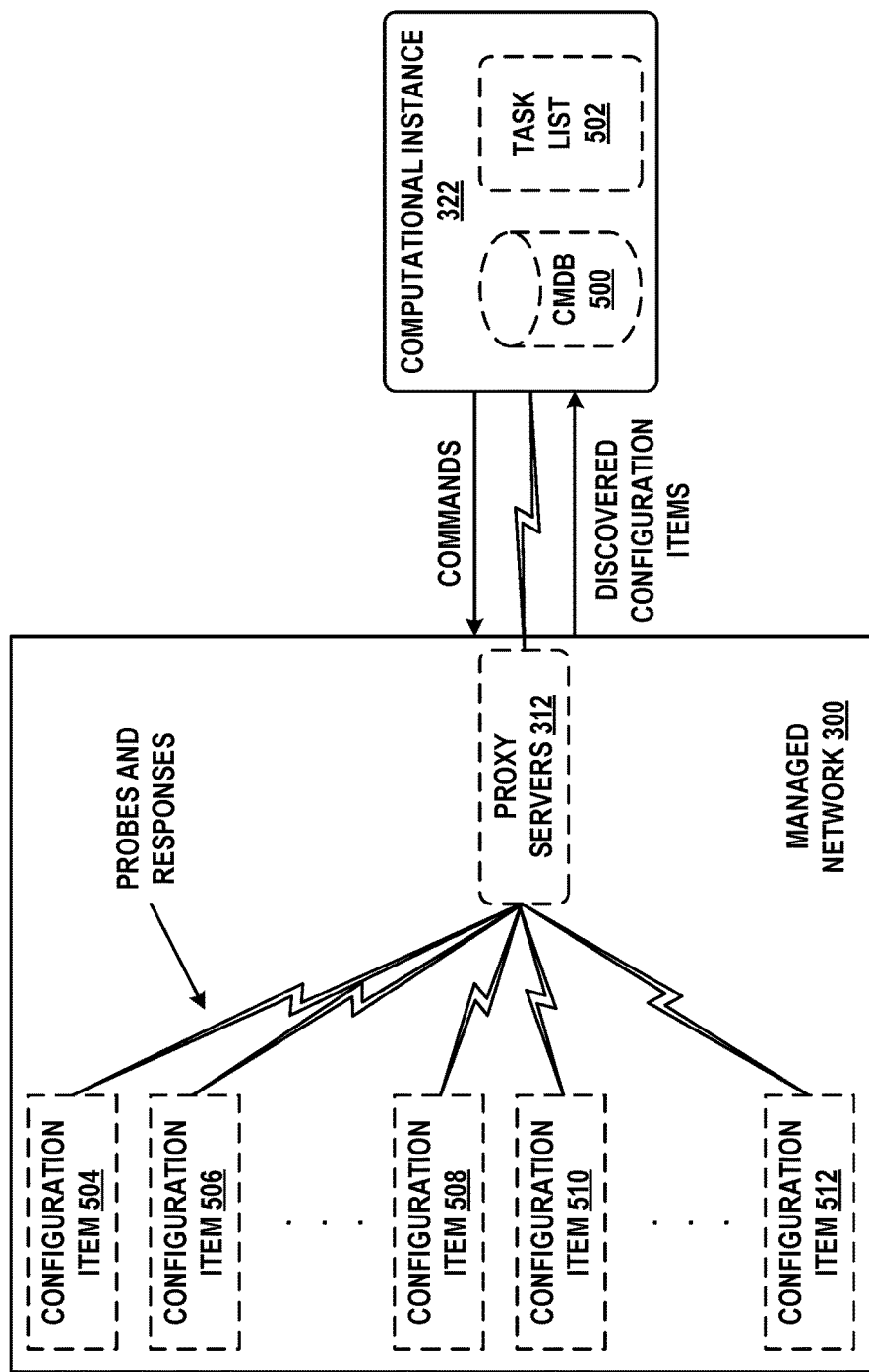
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500.

For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
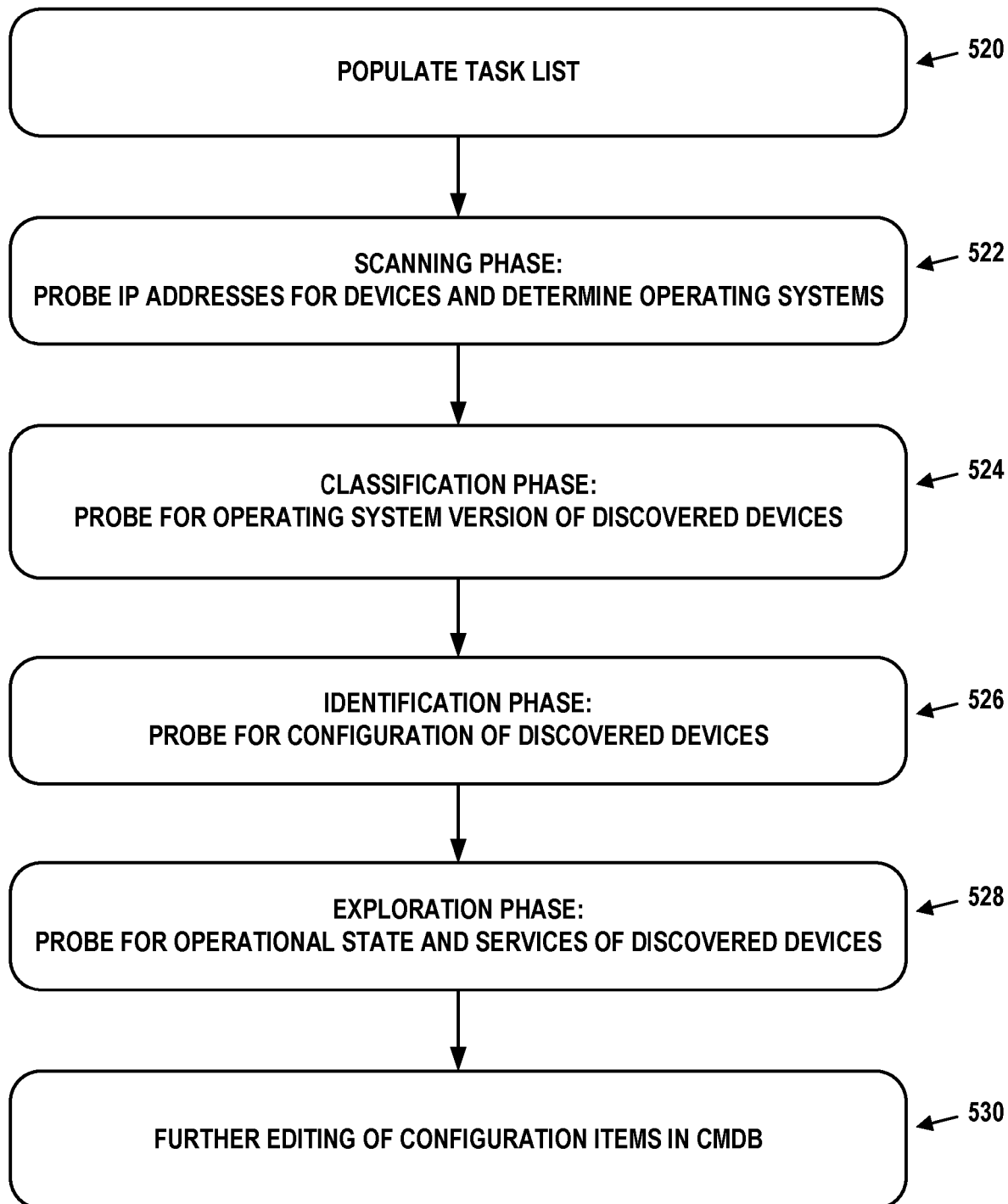
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Automated Error Detection and Resolution

As used herein, the term "application" may refer to any form of executable software, such as a program, process, thread, script, code module, or service.

As explained above, a remote network management platform may support the simultaneous execution of numerous applications of varying types. Even with rigorous testing, these applications may exhibit errors, including but not limited to instability (e.g., crashes, freezes), incorrect operation (e.g., providing wrong results), and/or undesirable behavior (e.g., excessive latency or resource utilization).

Detecting such errors can be difficult. Obvious errors, such as crashes, may be relatively straightforward to detect in some cases and often users will complain when they occur. More subtle errors, on the other hand, might be difficult to detect because users might ignore them or not even realize that an error has occurred. Debugging such errors to determine root cause can be much more complicated, as many applications rely on other applications, libraries, databases, remote servers, and so on. Thus, an error that presents itself in one application may have a root cause in the design or implementation of another application. Further, once a root cause is identified, a resolution may not be apparent. In some cases, an application may need to be restarted. In others, parameters may be able to be changed to resolve the error. Moreover, some errors may only be experienced by certain users carrying out certain patterns of activities, and the application may otherwise behave in the expected manner.

As a consequence, detection, root cause determination, and resolution of errors can be an enormously complex process. Even resolving a single error in an application can take hours or days of effort, which subjects users to undesirable experiences or can leave the application in an unusable or unstable state. Clearly, the traditional methods cannot scale to today's large, multi-application platforms.

To address these and possibly other deficiencies, the embodiments herein involve automated error detection and resolution by way of a rule-based framework. Advantageously, these embodiments can be adapted to detect and resolve a wide variety of errors, thus dramatically improving platform stability and performance.

Figure 6:
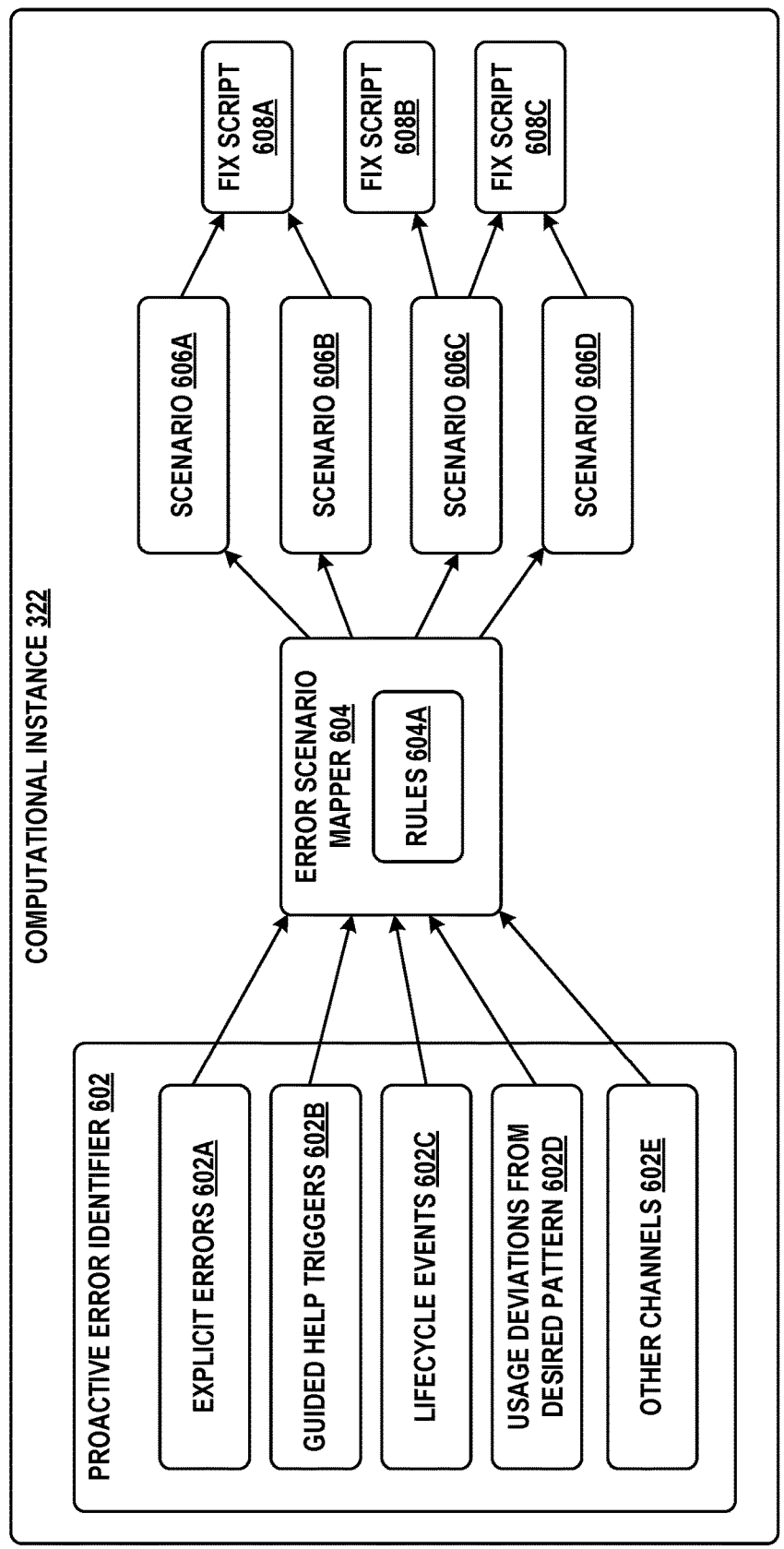
FIG. 6 depicts an architecture for autonomous error correction, in accordance with example embodiments.

FIG. 6 provides an example software architecture 600 for proactive error detection and resolution. All of the functionality depicted in architecture 600 may be implemented on a single computational instance (e.g., computational instance 322) or possibly split across multiple computational instances. The main elements include proactive error identifier 602, error scenario mapper 604, scenarios 606A, 606B, 606C, and 606D, and fix scripts 608A, 608B, and 608C. In various embodiments, more or fewer of these elements may exist. For example, there may be more or less than four scenarios and/or more or less than three fix scripts. In some implementations, proactive error identifier 602 and error scenario mapper 604 may be separate applications. In others, proactive error identifier 602 error scenario mapper 604 may be parts of the same or a common application.

Proactive error identifier 602 is an application or set of applications configured to obtain information regarding errors experienced by other applications operating on computational instance 322. The categories of these errors may include explicit errors 602A (e.g., errors indicated, signaled or reported by an application), guided help triggers 602B (e.g., a series of questions presented to a user that identify the type of error that a user might be experiencing with one or more applications), lifecycle events 602C (e.g., when new versions or patches of an application become available), usage deviations from desired patterns 602D (e.g., when a user navigates through a series of web-based resources in an unexpected order), and other channels 602E as well. Thus, various other error categories may be possible.

Figure 7:
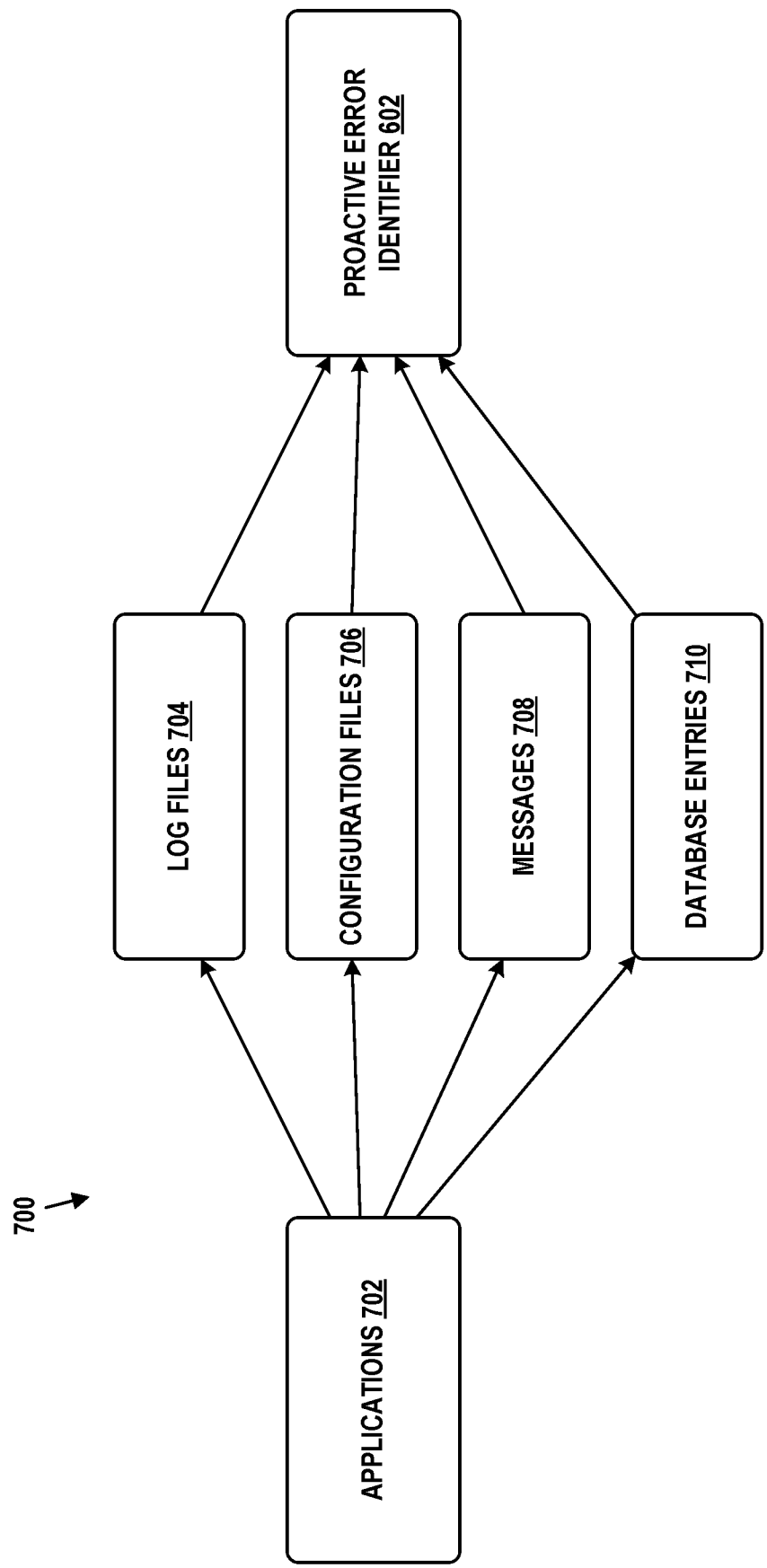
FIG. 7 depicts sources of error indications within a multi-application platform, in accordance with example embodiments.

The operation of proactive error identifier 602 is illustrated in FIG. 7. In arrangement 700, one or more applications 702 may use, access, or produce information in various locations of a platform, such as log files 704, configuration files 706, messages 708, and/or database entries 710. The content at these locations (referred to as resources) may, in turn, be read or accessed by proactive error identifier 602 in order to determine whether any errors related to applications 702 are identified therein.

In some embodiments, applications 702 may represent more than just application-layer software. For sake of convenience, what is referred to as applications 702 may include kernel, device driver, back-end, mid-tier, middleware, library, server, or user-facing software, as just some examples.

Log files 704 may be, for example, one or more system level log files, such as a syslog, event log, authentication log, kernel log, boot log, scheduled job (e.g., cron) log and so on. Alternatively or additionally, log files 704 may include application-level log files for mail services, web services, database services, and so on. These files may be stored in main memory or written to persistent storage. Generally, each of log files 704 consists of a time-ordered series of entries (e.g., text strings) written in accordance to a pre-established format. These entries may identify one or more of a timestamp, the source application of applications 702, a user of the source application, a severity, and a message. Not all entries explicitly indicate errors, but some may (e.g., when a source application is experiencing an error, it may write a message indicating the error to a log file). Further, error conditions may be inferred from a series of entries (e.g., a series of repeated log entries from a source application may indicate that the source application is unable to operate in an expected or desirable manner). Advantageously, the pre-established format for log entries may facilitate pattern matching and parsing of these entries (e.g., by way of regular expressions or finite state machines). Thus, proactive error identifier 602 may be able to programmatically determine errors from log files 704.

Configuration files 706 may be, for example, one or more files containing information used by an application of applications 702 to control its initiation and/or operation. The application may read one or more of configuration files 706 and apply the settings therein one or more times over the course of execution. Some of applications 702 may read from multiple configuration files. For instance, a web server may have a main configuration file as well as one or more secondary configuration files for plugins or loadable modules. Not unlike log files, configuration files 706 may include textual content in a pre-established format that is conducive to pattern matching and parsing (e.g., by way of regular expressions or finite state machines). In this manner, proactive error identifier 602 may be able to programmatically determine errors from configuration files 706. In some cases, proactive error identifier 602 may be able to identify possible errors in applications 702 from improper or invalid data in configuration files 706.

Messages 708 may be one or more sources of messages that may be provided by applications 702 or the underlying operating system of computational instance 322. These messages may be temporarily stored in message queues or some other inter-application messaging system for example. Some of these messages may explicitly indicate or implicitly suggest certain error conditions. In some cases, messages 708 may be sent to specifically to proactive error identifier 602, and in other cases messages 708 may be intended for another destination but ultimately read by proactive error identifier 602. Regardless, messages 708 may also conform to a pre-established format that facilitates pattern matching and parsing (e.g., by way of regular expressions or finite state machines). Accordingly, proactive error identifier 602 may be able to programmatically determine errors from messages 708.

Database entries 710 may include information written to rows of one or more tables in a relational database or otherwise stored in a non-relational database, for example. Each row may include several distinct data elements (e.g., columns) of various types (e.g., text string, numeric, referential). Given the strict formatting of each database entry, certain patterns of data within one entry or across multiple entries may be indicative of an error. As with log files 704, database entries 710 may explicitly indicate errors or store a series of entries from which error conditions may be inferred. In some cases, applications 702 may use such database tables for the purpose of logging, and therefore the functionality and/or content of log files 704 and database entries 710 may overlap to some extent.

Regardless of exact implementation, proactive error identifier 602 may obtain information regarding the behavior of applications 702 from one or more of these sources per application. In some embodiments, proactive error identifier 602 may do so on a regular basis (e.g., once every minute, 5 minutes, 10 minutes as specified by a timer), based on pre-established triggers (e.g., signals from applications 702, log file monitors, or database listeners), or on demand. From this data, proactive error identifier 602 may determine actual or likely error events and/or conditions.

Other sources not shown in FIG. 7 may be used as well. Thus, log files 704, configuration files 706, messages 708, and database entries 710 are just examples of sources.

Turning back to FIG. 6, proactive error identifier 602 may provide indications of errors that it has identified to error scenario mapper 604. These indications may be in a raw form or in a preprocessed form. For example, proactive error identifier 602 may provide relevant portions of log files 704, configuration files 706, messages 708, and/or database entries 710 indicative of errors to error scenario mapper 604. Alternatively, proactive error identifier 602 may process or summarize identified errors into a simplified form (e.g., a binary or textual value or set of values), and send this to error scenario mapper 604.

Error scenario mapper 604 may include a number of rules 604A that associate the indications of errors received from proactive error identifier to one or more of scenarios 606A, 606B, 606C, and 606D (which may also be referred to as "error scenarios"). Rules 604A may be absolute, in the sense that they will result in at most one of scenarios 606A, 606B, 606C, and 606D being associated with any particular error. Alternatively or additionally, rules 604A may be probabilistic in that they can associate more than one of scenarios 606A, 606B, 606C, and 606D with any particular error. In the latter case, error scenario mapper 604 may associate a probability or confidence value with one or more of scenarios 606A, 606B, 606C, and 606D. The higher this probability or confidence value for a given scenario, the more likely that it is the cause of the particular error (at least, according to the determination of error scenario mapper 604).

Rules 604A may take various forms, such as regular expressions, finite state machines, SQL expressions, arithmetic or logical expressions, other types of pattern matchers, word or token frequency counts, sematic parsers, or any combination of these and/or other techniques. Rules 604A may identify, for example, an error source (e.g., one or more files of files 704, one or more files of configuration files 706, one or more messages of messages 708, and/or one or more entries of database entries 710), an expression or parser that can be used to specify a pattern in the error indications from this error source (e.g., a regular expression, finite state machines, SQL expression, arithmetic or logical expression, another type of pattern matcher, word or token frequency count, and/or sematic parser), and then an indication of the scenario(s) of scenarios 606A, 606B, 606C, and 606D that is the suspected cause of the error condition.

In some embodiments, rules 604A may be in an ordered listing, and error scenarios mapper 604 may apply each of rules 604A to the error indications from proactive error identifier 602 in order until a match is found. If no matches are found, then error scenario mapper 604 may determine that no actual errors have been found or that no actual errors can be determined from the error indications.

Each of scenarios 606A, 606B, 606C, and 606D may be associated with one or more of fix scripts 608A, 608B, and 608C. These fix scripts may be programs that attempt to address the error conditions identified by their associated scenario(s). While referred to as "scripts" herein, fix scripts 608A, 608B, and 608C may each be one or more actual scripts, compiled programs, or other types of software code.

TABLE 1

| Application | Source | Freq | Pattern Matcher/Parser | Fix Script(s) |
|---|---|---|---|---|
| mywebserver | file://var/log/httpd-error.log | 60 secs | Look for "file not found" errors | File generator |
| mywebserver | file://var/log/httpd-access.log | 5 secs | Look for same user reloading same web page 3 or more times | Page refresher |
| mywebserver | file://etc/httpd/httpd.conf | 3600 secs/ on change | Check IP address binding | Configuration file rewriter |
| diskmon | file://var/log/syslog | 1800 secs | Look for reports of disk utilization over 90% | Garbage collector |
| myapp | file://var/log/myapp-err.log | 10 secs | Look for fatal errors | App restarter |
| myapp | db://myapp-db/table1 | 60 secs | Look for invalid values | Database integrity modifier |

Fix scripts 608A, 608B, and 608C may carry out various operations, such as terminating and restarting one or more applications (including but not limited to an application that indicated an error), editing a configuration file, editing database entries, generating or re-generating application content or other data, and so on. Each of scenarios 606A, 606B, 606C, and 606D may have a one-to-one association with fix scripts 608A, 608B, and 608C. However, in some cases, more than one of scenarios 606A, 606B, 606C, and 606D may be associated with the same fix script. In other cases, a single one of scenarios 606A, 606B, 606C, and 606D may be associated with multiple fix scripts.

With regard to how rules 604A are specified, error scenario mapper 604 may use or incorporate a mapping or table-like structure that lists applications, sources of error detection for this application (e.g., in the form of URLs), how frequently to check these sources (e.g., in seconds), a pattern matcher/parser to detect errors, and a reference to one or more fix scripts. An example of such a mapping is shown in Table 1.

The frequencies in Table 1 are for purposes of the example and may vary. Further, the pattern matcher/parser of Table 1 includes any combination of one or more regular expressions, finite state machines, SQL expressions, arithmetic or logical expressions, word or token frequency counts, sematic parsers, and/or other techniques.

The following subsections illustrate a number of error conditions that can be detected and possibly fixed by the system of architecture 600 using the examples of Table 1. These examples, however, are far from exhaustive and many others may exist.

A. Web Server "File Not Found" Errors

From time to time, certain links on a web site may not work as expected, in particular a web resource (e.g., web page) being sought by a user cannot be found by the web server. Such a resource may have been accidentally deleted or perhaps has not yet been generated from source data. In either case, when a user seeks to load this resource by way of a web browser, the web server will instead provide a "file not found" error, such as an HTTP 404 Not Found error. Receiving such error can interrupt user workflow and cause frustration.

A rule for this scenario is shown in the first row of Table 1. The application is identified as "mywebserver", which may be the name of its executable file. The source URL is "file://var/log/httpd-error.log" which identifies the file to which mywebserver logs errors. The frequency is once every 60 seconds. The pattern matcher/parser scans this log file for "file not found" errors. The fix script is a file generator that generates the missing file, or at least a default file with a helpful error message.

In other words, once every minute, the pattern matcher/parser is applied to the httpd-error.log file. In some cases, the entire file is processed. In other cases, only new entries in the file that were created in the last 60 seconds (since the previous check of the file) are processed. If the pattern matcher/parser identifies one or more files that were not found, it provides the locations and names of these files to the file generator fix script. Then, the file generator fix script generates an appropriate file with the specified file name, and places it in the specified location. In this way, future requests for the file will return a result.

B. Frequent Web Page Reloading

Occasionally a user may be waiting for a web page to refresh in order to obtain desired information therefrom. For instance, the refreshed web page may contain the outcome of a task (e.g., test results for an e-learning module) or reflect the latest status of something in which the user is interested (e.g., that the state of an IT trouble ticket has been modified). Web servers may refresh web pages based on triggers (e.g., changes in database entries related to the content to be displayed on the web page or reception of information to be displayed on the web page). In some cases, web pages may dynamically generated from data in files and/or database tables. But, these generated web pages might be cached for some period of time (e.g., a few minutes). Thus, the cached web page might not reflect the latest changes to the files and/or database tables. In such situations, a user expecting the web page to display these changes may manually refresh the web page some number of times in succession until the page is regenerated. This can lead to user confusion and irritation.

A rule for this scenario is shown in the second row of Table 1. The application is again "mywebserver". The source URL is "file://var/log/httpd-access.log" which identifies the file to which mywebserver logs the web pages requested by a user. These log entries may include a userid of an authenticated user, as well as a URL of the requested web page. The frequency is once every 5 seconds. The pattern matcher/parser scans this log file for the same user requesting the same web page at least 3 times within the 5-second period. The fix script is a page refresher that refreshes the requested page with the latest source data.

Thus, once every 5 seconds, the pattern matcher/parser is applied to the httpd-access.log file. In some cases, the entire file is processed. In other cases, only new entries in the file that were created in the last 5 seconds (since the previous check of the file) are processed. If the pattern matcher/parser identifies that the same user has requested a certain web page 3 or more times in the within the 5-second period, it provides the path and name of the file to the page refresher fix script. Then, the page refresher fix script regenerates the web page from the latest relevant information that is stored in main memory, the file system, and/or database entries. As a consequence, the user will be able to obtain the sought after information (if it is available) in a much quicker fashion—without having to wait for the cached page to time out.

C. Improper IP Address Binding

Server applications typically bind to TCP or UDP port numbers, as well as IP addresses. In some configurations, servers may bind to a single IP address. However, on systems with multiple IP addresses, servers may be able to bind to some or all of these addresses. If a server is configured to bind to one or more specific IP addresses, an indication of such may be stored in the server's configuration file. When the system changes IP addresses, the configuration file should be updated accordingly. However, this might not happen, resulting in the server being unable to initiate or other errors.

A rule for this scenario is shown in the third row of Table 1. The application is again "mywebserver". The source URL is "file://etc/httpd/httpd.conf" which identifies the main configuration file of mywebserver. This configuration file may be in the typical UNIX® form (e.g., with configurable settings appearing on one or more lines along with their values). The frequency is once every 3600 seconds or when the configuration file changes. The latter functionality may involve a watcher script that triggers whenever the configuration file is edited or rewritten. The pattern matcher/parser scans the configuration file for the IP addresses to which mywebserver is to bind. The fix script is a configuration file rewriter that attempts to repair invalid entries in the configuration file.

Therefore, once every 3600 seconds or upon detected change, the pattern matcher/parser is applied to the httpd.conf file. If the pattern matcher/parser detects that mywebserver is attempting to bind to one or more invalid IP addresses, it implicitly or explicitly signals the configuration file rewriter fix script. Then, the configuration file rewriter fix script edits the configuration file so that mywebserver binds only to valid IP addresses that are configured for use by the system. Thus, errors in the httpd.conf file can be detected and corrected almost as quickly as they occur.

D. High Disk Utilization

A common cause of system failure is running out of useable disk space. For example, the amount of data stored by some applications (e.g., in databases) or written to log files may grow to the point that there is no room left in the applicable disk partition. As a consequence, these and other applications that rely on there being at least some amount of disk space may fail. In order to avoid these failures, disk utilization growing beyond a threshold amount can be used as a trigger for cleaning up unneeded data stored on the disk.

A rule for this scenario is shown in the fourth row of Table 1. The application is "diskmon", which is assumed to be configured to check disk utilization periodically, and log readings of high disk utilization. The source URL is "file://var/log/syslog" which identifies the file to which these readings of high disk utilization are written. The frequency is once every 1800 seconds. The pattern matcher/parser scans the syslog file for messages indicating high disk utilization, over 90% for example. The fix script is a garbage collector that attempts to reduce disk utilization. It may do this by deleting unneeded temporary files, deleting or compressing old log entries, defragmenting databases, and/or other activities.

Accordingly, once every 1800 seconds, the pattern matcher/parser is applied to the syslog file. If the pattern matcher/parser detects that diskmon has logged messages indicating high disk utilization, execution of the garbage collector fix script is triggered. Then, the garbage collector fix script attempts to reduce disk utilization. Thus, useable disk space may be increased.

E. Fatal Application Errors

Not unlike web servers, other types of applications may also use dedicated log files to record events such as errors. In some cases, an application that is experiencing a fatal error, from which it cannot recover without being restarted, will indicate as such in a log file. These fatal errors could be crashes, faults, or other unexpected occurrences that render the application unusable for its intended purpose. Fatal errors may be clearly marked in the log file, for example containing the text string "FATAL ERR".

A rule for this scenario is shown in the fifth row of Table 1. The application is "myapp". The source URL is "file://var/log/myapp-err.log" which identifies the error log file of myapp. The frequency is once every 10 seconds. The pattern matcher/parser scans the myapp-err.log file for log messages indicating a fatal error. The fix script is an app restarter that attempts to re-execute, re-run, or otherwise reinitiate myapp. That may include terminating some or all processes associated with myapp and restarting the application.

Therefore, once every 10 seconds, the pattern matcher/parser is applied to the myapp-err.log file. If the pattern matcher/parser detects that myapp has logged one or more fatal error message since the last time that myapp-err.log was checked, execution of the app restarter fix script is triggered. Then, the app restarter fix script attempts to restart the application. In this manner, application failures are rapidly detected and corrected.

F. Invalid or Corrupted Database Content

Many modern applications rely to some extent on databases to store content, whether it is related to the configuration, input, or output of these applications. Therefore, it is critical that the information in these databases is correct. Nonetheless, databases can be corrupted, thought application errors, manual editing by users, during an upgrade to a new schema, or from other causes. For example, in a relational database, values in a single row can be invalid in the sense that the reading application is not designed to process these values. Alternatively or additionally, certain values in multiple tables or rows may be expected to have a particular type of relationship that they do not. Common invalid values may include references to deleted columns or rows, as well as duplicated entries. When such corruption occurs, the applications relying on the information may not be able to function properly.

A rule for this scenario is shown in the sixth row of Table 1. The application is again "myapp". The source URL is "db://myapp-db/table1" which identifies a tables within a myapp database. The frequency is once every 60 seconds. The pattern matcher/parser scans table1 for invalid values. The fix script is a database integrity modifier that attempts to eliminate these invalid values and/or replace them with valid values. For example, references to invalid rows or columns may be deleted or replaced with references to valid rows or columns.

Thus, once every 60 seconds, the pattern matcher/parser is applied to table1. If the pattern matcher/parser detects that table1 contains invalid values, execution of the database integrity modifier fix script is triggered. Then, the database integrity modifier fix script attempts to clean the database in the fashion proscribed above or in other ways. Therefore, database integrity can be maintained.

G. Other Uses

The automated error detection and resolution techniques described herein can be used for more than just the scenarios above. These techniques are flexible and can be adapted to many different types of situations where application behavior on a remote network management platform is not occurring in an expected fashion.

VI. Example Operations

Figure 8:
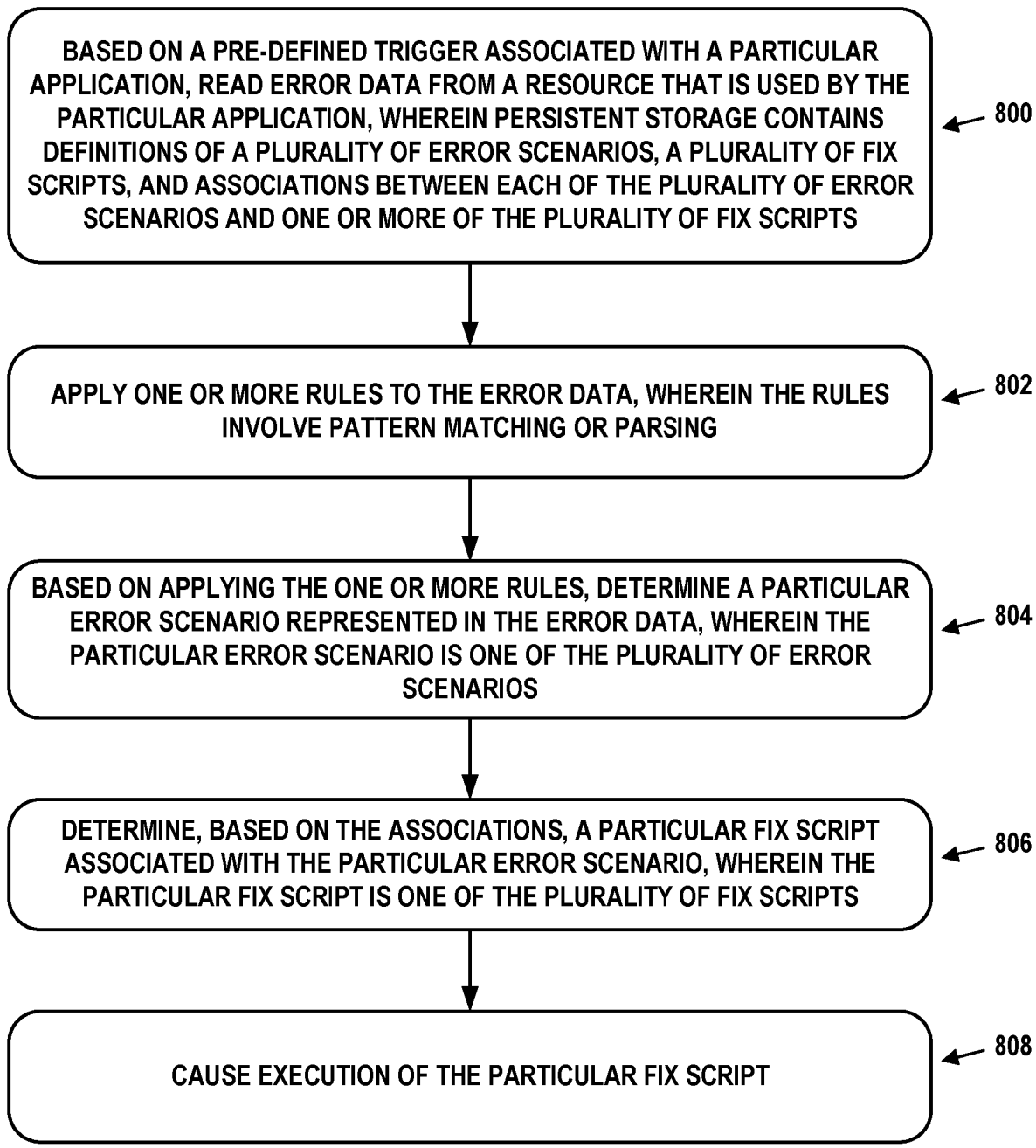
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve, possibly based on a pre-defined trigger associated with a particular application, reading error data from a resource that is used by the particular application, wherein persistent storage contains definitions of a plurality of error scenarios, a plurality of fix scripts, and associations between each of the plurality of error scenarios and one or more of the plurality of fix scripts. These operations may be performed by an error identifier application.

Block 802 may involve applying one or more rules to the error data, wherein the rules involve pattern matching or parsing. These operations may be performed by an error scenario mapping application.

Block 804 may involve, possibly based on applying the one or more rules, determining a particular error scenario represented in the error data, wherein the particular error scenario is one of the plurality of error scenarios. These operations may be performed by the error scenario mapping application.

Block 806 may involve determining, based on the associations, a particular fix script associated with the particular error scenario, wherein the particular fix script is one of the plurality of fix scripts. These operations may be performed by the error scenario mapping application.

Block 808 may involve causing execution of the particular fix script.

In some embodiments, the error identifier application and the error scenario mapping application are parts of a common application.

In some embodiments, determining the particular error scenario represented in the error data comprises determining a particular rule of the one or more rules through which the pattern matching or parsing of the error data indicates the particular error scenario.

In some embodiments, each particular rule of the one or more rules contains a name of an application to which the particular rule applies, a location of the resource, a frequency at which the resource is to be checked, a definition of a pattern matcher or parser to apply to data of the resource, and a specification of one or more of the plurality of fix scripts.

In some embodiments, the resource is an error log file, the particular error scenario represented in the error data is that the particular application cannot find a file, and the particular fix script is configured to generate a version of the file.

In some embodiments, the resource is an access log file, the particular error scenario represented in the error data is that the particular application is being requested to provide a file more than a threshold number of times within a fixed period, and the particular fix script is configured to refresh the file from its source data.

In some embodiments, the resource is a configuration file, the particular error scenario represented in the error data is that the configuration file contains invalid content, and the particular fix script is configured to rewrite the configuration file with valid content.

In some embodiments, the resource is a log file, the particular error scenario represented in the error data is that storage utilization of a storage device within the system has exceeded a pre-defined threshold, and the particular fix script is configured to delete or compress certain units of data on the storage device.

In some embodiments, the resource is a log file, the particular error scenario represented in the error data is that the log file contains indications of fatal errors from the particular application, and the particular fix script is configured to restart the particular application.

In some embodiments, the resource is a database table, the particular error scenario represented in the error data is that the database table contains invalid values, and the particular fix script is configured to restore integrity of the database table.

In some embodiments, the pre-determined trigger is based on a timer or detection of a modification to the resource.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing an error identifier application, an error scenario mapping application, definitions of a plurality of error scenarios, a plurality of fix scripts, and associations between each of the plurality of error scenarios and one or more of the plurality of fix scripts; and
   one or more processors configured to:
   based on a pre-defined trigger, read, by the error identifier application, error data from a log that is stored on the system, wherein the log is used by a particular application;
   apply, by the error scenario mapping application, one or more rules to the error data, wherein the rules involve pattern matching or parsing of the error data;
   based on applying the one or more rules, determine, by the error scenario mapping application, a particular error scenario represented in the error data, wherein the particular error scenario is that the particular application is being requested to provide a file more than a threshold number of times within a fixed period;
   determine, by the error scenario mapping application and based on the associations, a particular fix script associated with the particular error scenario, wherein the particular fix script is one of the plurality of fix scripts and is configured to regenerate an updated version of the file from its source data; and
   cause execution of the particular fix script.

2. The system of claim 1, wherein the error identifier application and the error scenario mapping application are parts of a common application.

3. The system of claim 1, wherein determining the particular error scenario represented in the error data comprises determining a particular rule of the one or more rules through which the pattern matching or parsing of the error data indicates the particular error scenario.

4. The system of claim 1, wherein each particular rule of the one or more rules contains a name of an application to which the particular rule applies, a location of a resource, a frequency at which the resource is to be checked, a definition of a pattern matcher or parser to apply to data of the resource, and a specification of one or more of the plurality of fix scripts.

5. The system of claim 1, wherein the pre-defined trigger is based on detection of a modification to the log.

6. The system of claim 1, wherein the log is implemented as a text-based log file.

7. The system of claim 1, wherein the log is implemented in a database table.

8. The system of claim 1, wherein a single user has requested that the particular application provide the file more than the threshold number of times within the fixed period.

9. The system of claim 1, wherein the threshold number of times is at least 3 and the fixed period is 5 seconds.

10. The system of claim 1, wherein the file is a web page, and wherein regenerating the updated version of the file from its source data comprises generating the updated version of the file from information stored in main memory, a file system, or database entries.

11. The system of claim 1, wherein the file is a web page, and wherein regenerating the updated version of the file from its source data comprises replacing a cached version of the file with the updated version of the file.

12. A computer-implemented method comprising:
based on a pre-defined trigger, reading, by an error identifier application, error data from a log that is used by a particular application, wherein persistent storage contains definitions of a plurality of error scenarios, a plurality of fix scripts, and associations between each of the plurality of error scenarios and one or more of the plurality of fix scripts;
applying, by an error scenario mapping application, one or more rules to the error data, wherein the rules involve pattern matching or parsing of the error data;
based on applying the one or more rules, determining, by the error scenario mapping application, a particular error scenario represented in the error data, wherein the particular error scenario is that the particular application is being requested to provide a file more than a threshold number of times within a fixed period;
determining, by the error scenario mapping application and based on the associations, a particular fix script associated with the particular error scenario, wherein the particular fix script is one of the plurality of fix scripts and is configured to regenerate an updated version of the file from its source data; and
causing execution of the particular fix script.

13. The computer-implemented method of claim 12, wherein each particular rule of the one or more rules contains a name of an application to which the particular rule applies, a location of a resource, a frequency at which the resource is to be checked, a definition of a pattern matcher or parser to apply to data of the resource, and a specification of one or more of the plurality of fix scripts.

14. The computer-implemented method of claim 12, wherein the pre-defined trigger is based on detection of a modification to the log.

15. The computer-implemented method of claim 12, wherein a single user has requested that the particular application provide the file more than the threshold number of times within the fixed period.

16. The computer-implemented method of claim 12, wherein the file is a web page, and wherein regenerating the updated version of the file from its source data comprises generating the updated version of the file from information stored in main memory, a file system, or database entries.

17. The computer-implemented method of claim 12, wherein the file is a web page, and wherein regenerating the updated version of the file from its source data comprises replacing a cached version of the file with the updated version of the file.

18. An article of manufacture including a non-transitory computer-readable medium, having stored thereon program instructions that, upon execution by a computing system, cause the computing system to perform operations comprising:
based on a pre-defined trigger, reading error data from a log that is used by a particular application, wherein persistent storage contains definitions of a plurality of error scenarios, a plurality of fix scripts, and associations between each of the plurality of error scenarios and one or more of the plurality of fix scripts;
applying one or more rules to the error data, wherein the rules involve pattern matching or parsing of the error data;
based on applying the one or more rules, determining a particular error scenario represented in the error data, wherein the particular error scenario is that the particular application is being requested to provide a file more than a threshold number of times within a fixed period;
determining, based on the associations, a particular fix script associated with the particular error scenario, wherein the particular fix script is one of the plurality of fix scripts and is configured to regenerate an updated version of the file from its source data; and
causing execution of the particular fix scripts.

19. The article of manufacture of claim 18, wherein a single user has requested that the particular application provide the file more than the threshold number of times within the fixed period.

20. The article of manufacture of claim 18, wherein the file is a web page, and wherein regenerating the updated version of the file from its source data comprises generating the updated version of the file from information stored in main memory, a file system, or database entries.

* * * * *